United States Patent
Ferren et al.

(10) Patent No.: US 9,235,303 B2
(45) Date of Patent: Jan. 12, 2016

(54) MICRO DEFLECTORS ON TOUCH SENSOR

(75) Inventors: Bran Ferren, Beverly Hills, CA (US); Michael Keesling, Agoura Hills, CA (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 13/992,651

(22) PCT Filed: Dec. 20, 2010

(86) PCT No.: PCT/US2010/061374
§ 371 (c)(1),
(2), (4) Date: Aug. 16, 2013

(87) PCT Pub. No.: WO2012/087286
PCT Pub. Date: Jun. 28, 2012

(65) Prior Publication Data
US 2014/0009440 A1 Jan. 9, 2014

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 2203/04106* (2013.01)

(58) Field of Classification Search
None
See application file for complete search history.

(56) References Cited

U.S. PATENT DOCUMENTS

| 6,492,978 | B1 * | 12/2002 | Selig et al. ................... 345/173 |
| 2003/0026971 | A1 | 2/2003 | Inkster et al. |
| 2009/0293632 | A1 * | 12/2009 | Conrad et al. .................. 73/777 |
| 2010/0231532 | A1 | 9/2010 | Nho et al. |
| 2010/0277431 | A1 | 11/2010 | Klinghult |
| 2010/0302153 | A1 | 12/2010 | Jung et al. |
| 2010/0315337 | A1 | 12/2010 | Ferren et al. |
| 2011/0141052 | A1 * | 6/2011 | Bernstein et al. ............. 345/174 |
| 2012/0050165 | A1 * | 3/2012 | Kim et al. ..................... 345/168 |
| 2012/0068970 | A1 * | 3/2012 | Pemberton-Pigott ......... 345/175 |

OTHER PUBLICATIONS

International Preliminary Report on Patentability dated Jul. 4, 2013, in International Patent Application No. PCT/US2010/061374, 5 pages.

* cited by examiner

*Primary Examiner* — Nicholas Lee
*Assistant Examiner* — Duane N Taylor, Jr.
(74) *Attorney, Agent, or Firm* — Blakely, Sokoloff, Taylor & Zafman LLP

(57) ABSTRACT

In various embodiments, a touch surface may comprise multiple individual sensors, each of which is capable of mechanical deflection in a direction parallel to the surface, with the device using the touch surface being able to detect such deflection in each sensor. With this capability, the device may be able to detect intended movement of a touch over the touch surface even if no additional sensors are activated by that movement. Such sensors may be useful for detecting very small motions, and may be especially useful for motions in which the shape of the user's thumb results in the same touch area being in contact with the thumb even though the thumb is executing an extension or retraction movement.

19 Claims, 6 Drawing Sheets

3 x 3 Sensor Array

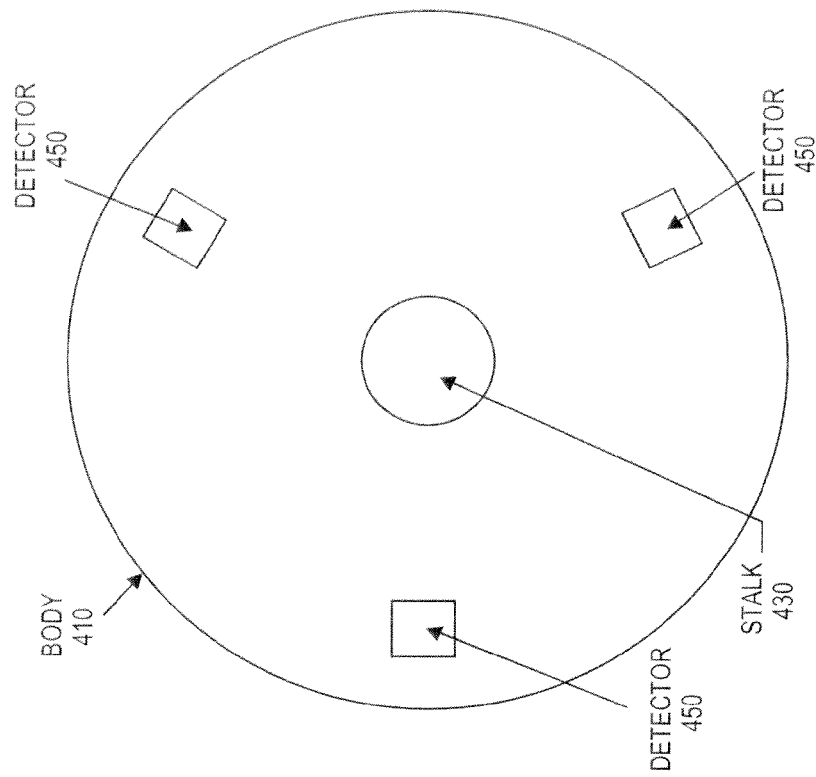
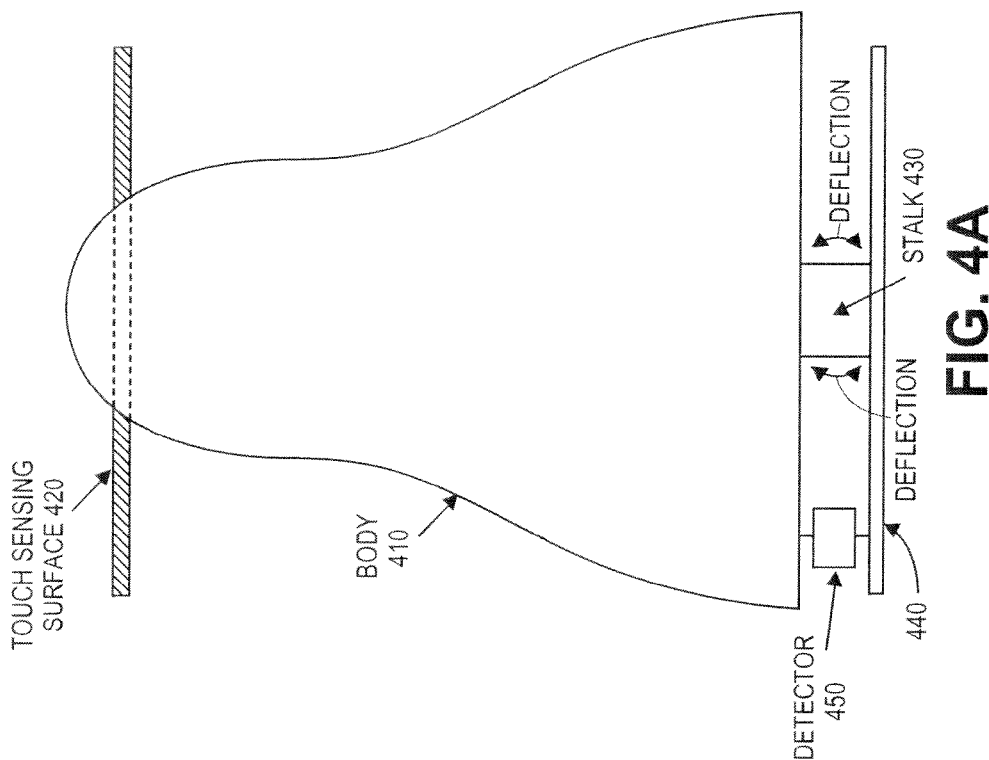
FIG. 4B
FIG. 4A

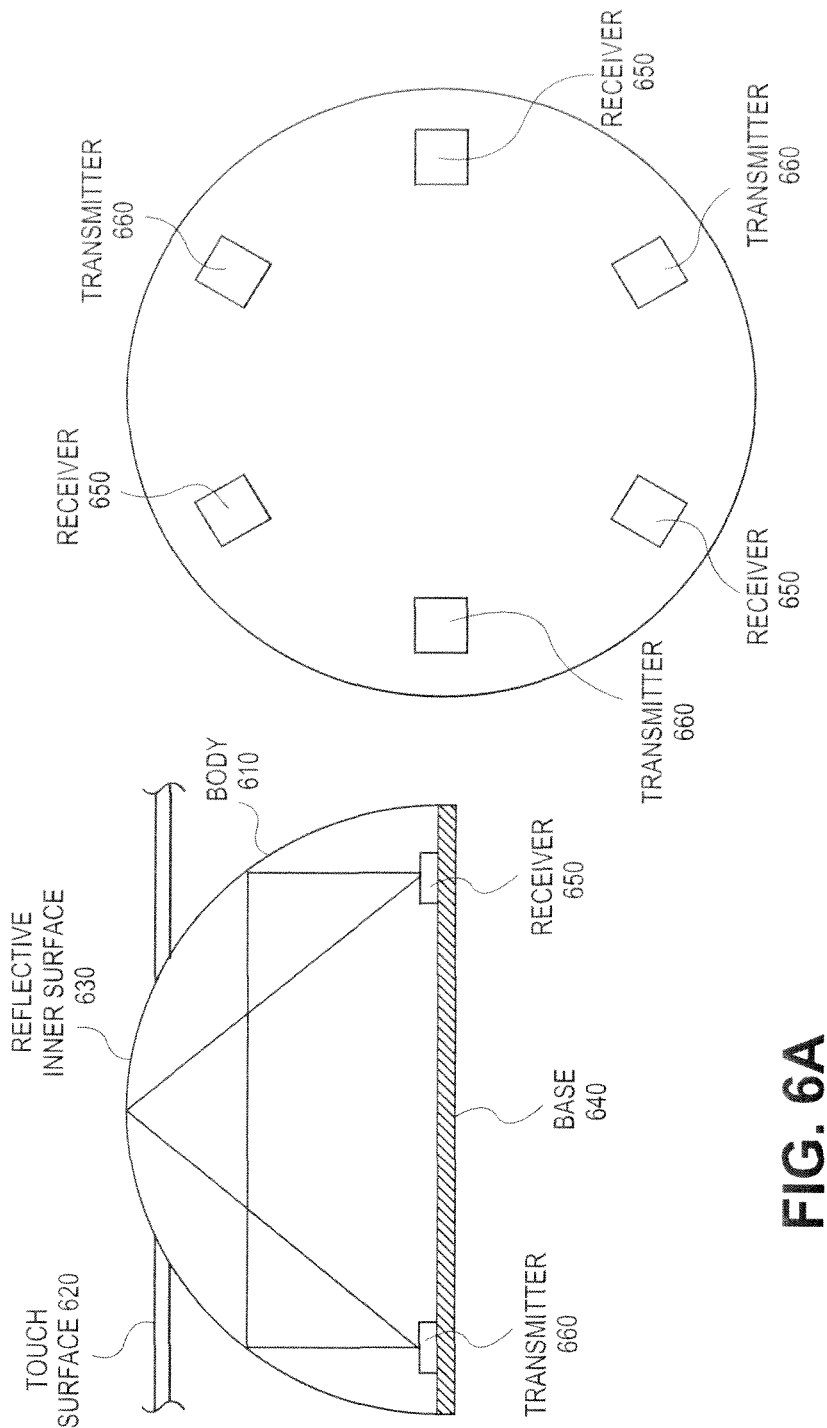

MICRO DEFLECTORS ON TOUCH SENSOR

BACKGROUND

Touch pads have been in use for a number of years. Most of them use capacitive sensing to detect when and where the surface of the touch pad has been touched by the user. Flat touch pads typically have an array of many such capacitive sensors, and can infer motion gestures as the user's fingertip drags across the surface and activates more sensors in the array. But if the surface has a complex curvature, it may be more cost effective to place a small number of comparatively large sensors at or under the surface. However, a smaller number of sensors makes the device relatively insensitive to small motions, since the resolution is inherently poor. Further, as devices become smaller, the user is more likely to use his thumb to activate the touch surface. The mechanics of the human thumb are such that extension of the thumb may cause the tip of the thumb to lift off the touch surface as the more proximal portion of the thumb makes contact, leaving the contact area on the touch surface relatively unchanged when the thumb is extended. This could be incorrectly sensed by the device as no motion by the thumb.

BRIEF DESCRIPTION OF THE DRAWINGS

Some embodiments of the invention may be better understood by referring to the following description and accompanying drawings that are used to illustrate embodiments of the invention. In the drawings:

FIGS. 4A, 4B show a tilting structure for indicating deflection, according to an embodiment of the invention.

FIGS. 6A, 6B show an optical implementation for a micro-deflector, according to an embodiment of the invention.

DETAILED DESCRIPTION

Figure 1:
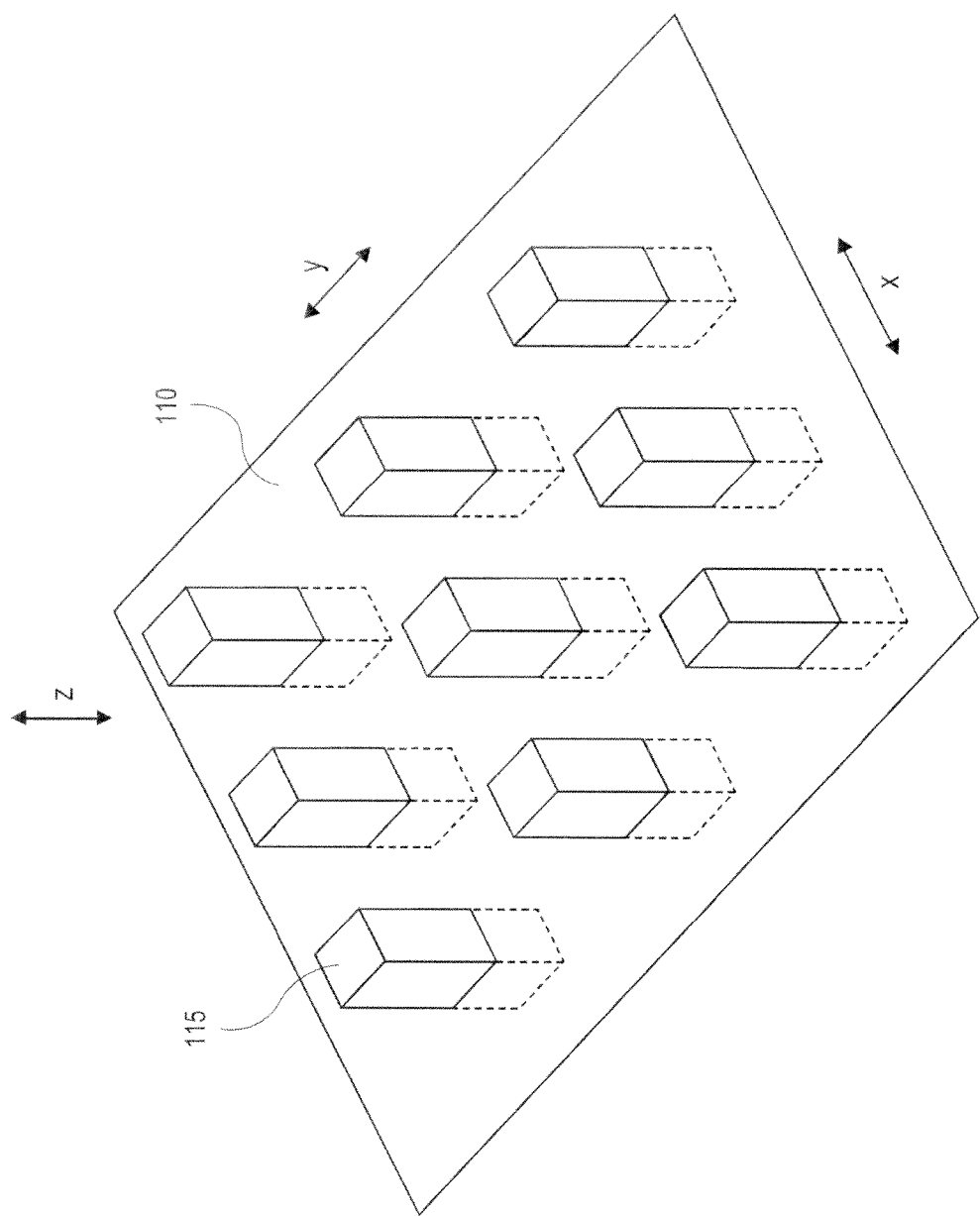
FIG. 1 shows a touch surface having multiple mechanical sensors, each capable of mechanical deflection in response to a dragging motion across the surface by another object, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible non-transitory storage medium, such as but not limited to read only memory (ROM); random access memory (RAM); magnetic disk storage media; optical storage media; a flash memory device, etc.

A touch surface, as the term is used herein, provides an input for a computer device by generating electrical signals indicating where an object is touching the touch surface. In various embodiments, a touch surface may comprise multiple individual sensors, each of which is capable of mechanical deflection in a direction substantially parallel to the surface, with the device able to detect such deflection in each sensor. With this capability, the device may be able to detect intended movement of the touch over the touch surface even if no additional sensors are activated by that movement. This information may be used to, for example, trigger a command to a device to perform some function. In some embodiments, the device may be able to determine, within a predetermined tolerance, one or more of 1) the direction of deflection, 2) the amount of deflection, 3) the speed of deflection, and 4) the force of deflection. Such devices may be useful for characterizing very small motions, and may be especially useful for motions in which the shape of the user's thumb (or other finger) results in the same touch area being in contact with the thumb even though the thumb is executing an extension or retraction movement. Each sensor may provide an electrical signal, and/or a variation in an electrical signal, to indicate the deflection.

FIG. 1 shows a touch surface having one or more mechanical sensors, each capable of mechanical deflection in response to a dragging motion across the surface by another object, according to an embodiment of the invention. The illustrated embodiment shows a touch surface 110, with nine sensors 115. For 3-dimensional direction reference, X-Y-Z coordinates are shown, with the touch surface 110 being indicated as flat in the horizontal (X and Y) dimensions, with the sensors sticking up vertically (in the Z direction) perpendicular to that surface. In general, this reference system will be assumed in the descriptions contained herein. However, this is only for convenience and consistency of description. Any reference system may be used to describe the illustrated elements and their actions.

The illustrated embodiment indicates particular shapes, configurations, and relative sizes, but this is for convenience of illustration only. Any feasible shapes, configurations, and/ or relative sizes may be used. For example, the sensors 115 are shown arranged in a rectilinear matrix, but any feasible pattern of sensors may be used. Each individual sensor 115 is shown as having a rectangular shape, but the sensors may have any feasible shape. A portion of each sensor 115 is shown as extending below the surface 110, but in other embodiments the sensors may not extend below the surface. Surface 110 is shown as being flat, but in other embodiments may have a more complex shape, such as curved and/or angular. The drawing indicates a relative height, width, and spacing for the sensors, but these parameters may have any dimensions, either in absolute terms or relative to each other, that will enable the touch surface to perform its intended functions.

In some embodiments, the sensors are intended to be activated by a human finger or thumb dragging across the surface 110, and the relative dimensions will therefore be adequate to sense this motion. In such a use, the sensors may be deflected at least partly by the ridges in the fingertip, and might therefore be too small to be seen in detail by the unaided eye. Such very small sensors may be termed micro-deflectors or micro-deflector sensors. In this document, the term 'finger' will be considered broad enough to include the thumb.

Each sensor may be designed so that physical deflection of the sensor may be detected. In some embodiments, the sensors may deflect in any direction parallel to the surface 110, while in other embodiments the sensors may be constrained to deflect in one, two, three, four, or another small number of directions parallel to the surface 110. Regardless of the number of directions in which physical deflection may occur, in some embodiments the electronics associated with reading the sensors may convert that to a simpler coordinate system, such as converting it into X and Y components. In some embodiments, when the pressure that caused the deflection is released, the sensor may return to a 'neutral' position (such as but not limited to upright), and this position may also be detected by the system.

In some embodiments, the amount of deflection may only be detected as being present or absent, i.e., deflection or no deflection, with no ability to sense the amount of deflection. Other embodiments may be able to sense how much a sensor has been deflected, and convert that into an analog or digital value. In some embodiments, the duration of time that the sensor is deflected may be determined, such as by reading the inputs from the sensor at closely spaced intervals of time. In some embodiments, the speed of deflection may be detectable (i.e., how quickly the sensor moves from its neutral position to its deflected position). In other embodiments this may not be feasible.

The touch surface containing the micro-deflectors may assume any feasible contour. A flat surface would make it a simple replacement for touch pads on notebook computer keyboards, or for a touchscreen that both displays an image and detects inputs created by touching the screen. However, other more complex contours may also be used. For example, a saddle-shaped touch button with both convex and concave contours may be used. Such a shape is described in U.S. patent application Ser. No. 12/650,582, filed Dec. 31, 2009. In some embodiments, the touch surface may be flexible, and may therefore be reshaped into many different contours.

In some embodiments, the touch surface may form a part of a more complex input device. For example, the entire touch surface may be placed onto a structure that may be moved vertically (such as placing the touch surface on the top of a button that can be pressed downward), and such movement may trigger another input signal separate from the deflector inputs. In some embodiments, the touch surface may have additional touch sensors of a different type. For example, the touch surface may also contain multiple capacitive or capacitive/optical sensors which may be used to detect touch over a give area, while the deflectors may be used to determine that the object performing the touch is moving, even if the capacitive and/or optical sensors do not detect such movement. Such a combination of sensors may be particularly useful for detecting the movement of the human thumb on a touch surface, since the mechanics of the human thumb may produce little or no change in the location of the touch area when the thumb is extended or retracted slightly.

Figure 2:
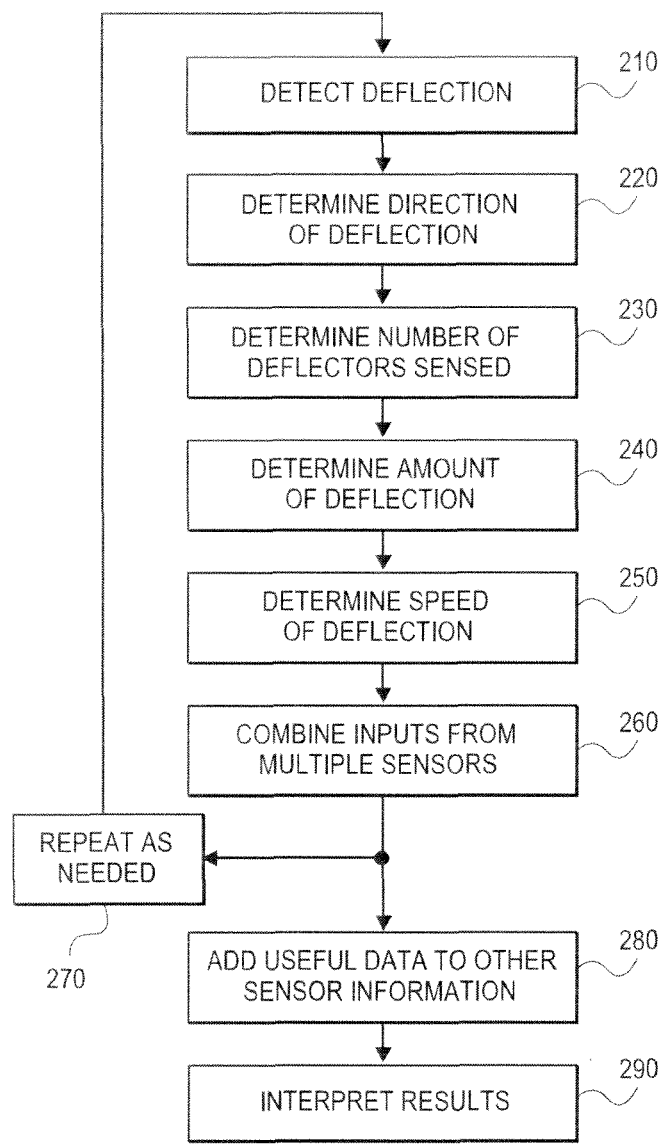
FIG. 2 shows a flow diagram of a method of detecting inputs from micro-deflector sensors, according to an embodiment of the invention.

FIG. 2 shows a flow diagram of a method of detecting inputs from micro-deflector sensors, according to an embodiment of the invention. The described method assumes the electronics are in place to detect deflection of the sensors, and the method further includes detection of multiple types of information from the sensors, some of which may not be in every embodiment.

The method begins at 210 when a deflection of one or more sensors is detected. Such detection may be triggered through any feasible means, such as but not limited to: 1) a computer interrupt, 2) an alert signal, 3) through repeated sampling or monitoring of the sensors, 4) etc. At 220 the direction of deflection may be determined. Many types of micro-deflectors will be constructed so that the direction of deflection is part of the information provided by the individual micro-deflector. When deflection in multiple micro-deflectors is sensed, directional inputs from all or part of them may be combined to produce an overall direction, which may then be attributed to all of them.

Various other types of inputs may also be determined, and may be used in various ways. For example, the number of micro-deflectors that are registering a deflection may be determined at 230. Depending on the density and spacing of such micro-deflectors, this might be used to determine if a deflection should even be registered (e.g., a single deflection in a dense array of sensors would probably only indicate a faulty sensor). The size of the area in which most sensors are registering a deflection may indicate whether a fingertip or stylus is being used. Other useful information may also be determined from the number of sensors that are indicating a deflection.

At 240 the amount of deflection may be determined. This might in turn be used to determine the pressure with which the fingertip is contacting the touch surface, which could provide another input for interpreting the moving touch. Alternately, slight deflection might indicate the leading edge of the moving touch area, while additional deflection might indicate the interior of the moving touch.

At 250 the speed of deflection may be determined (i.e., how quickly the micro-deflector goes from non-deflection to a particular amount of deflection). In some embodiments the sensor itself may be constructed in a manner that provides this information. In other embodiment, the deflection may be monitored at such closely spaced intervals of time that the speed of deflection may be derived.

Operations 230, 240, and 250 deal with parameters that may be gathered from each of the individual sensors. But the data from multiple sensors may be combined at 260 in ways that produce other useful information. For example, when most of the sensors in a given area report deflection in the same direction, movement of a fingertip in that direction may be interpreted, even if the location of the touch area does not change significantly. Deflection of a few sensors in a different direction may be considered individual abnormalities which can be ignored.

Since detecting motion across a touch surface is a continuing operation, steps 210-260 may be repeated as necessary through 270 to get continuing information from the micro-deflectors. In some instances, information from the micro-deflectors may be sufficient to accomplish the needed inputs. But in other instances, this information may be combined with inputs from other sensors at 280 to provide a wider variety of useful input information. For example, if the touch surface also has a binary switch function based on pressing the touch surface, that on-off switch may add to the functionality of the touch surface.

In another example, in addition to the micro-deflectors the touch surface may include an array of additional sensors, to be used in combination with the micro-deflectors to interpret input from a user. In particular, an array of additional capacitive sensors or optical-capacitive sensors may be used in combination with the multiple micro-deflector sensors to determine an input motion from a user's thumb. Since the end of a human thumb tends to lift away from the touch surface when the thumb is extended, leaving the touch area relatively unchanged, the micro-deflectors might be used to determine an input motion from a user's thumb when the capacitive sensors do not detect that motion. Other such sensor combinations may also be possible.

Whatever combination of sensor information is gathered, the results may be interpreted and used at 290. For example, the detected deflection of the micro-deflectors may be used to move a cursor across a screen in a manner similar to that of a computer mouse, while pressing the touch surface to close a switch may imitate depressing the button on that computer mouse.

Micro-deflector sensors may use various technologies to sense deflection. Some of them are described in the following sections.

Magnetic Cartridge

Figure 3:
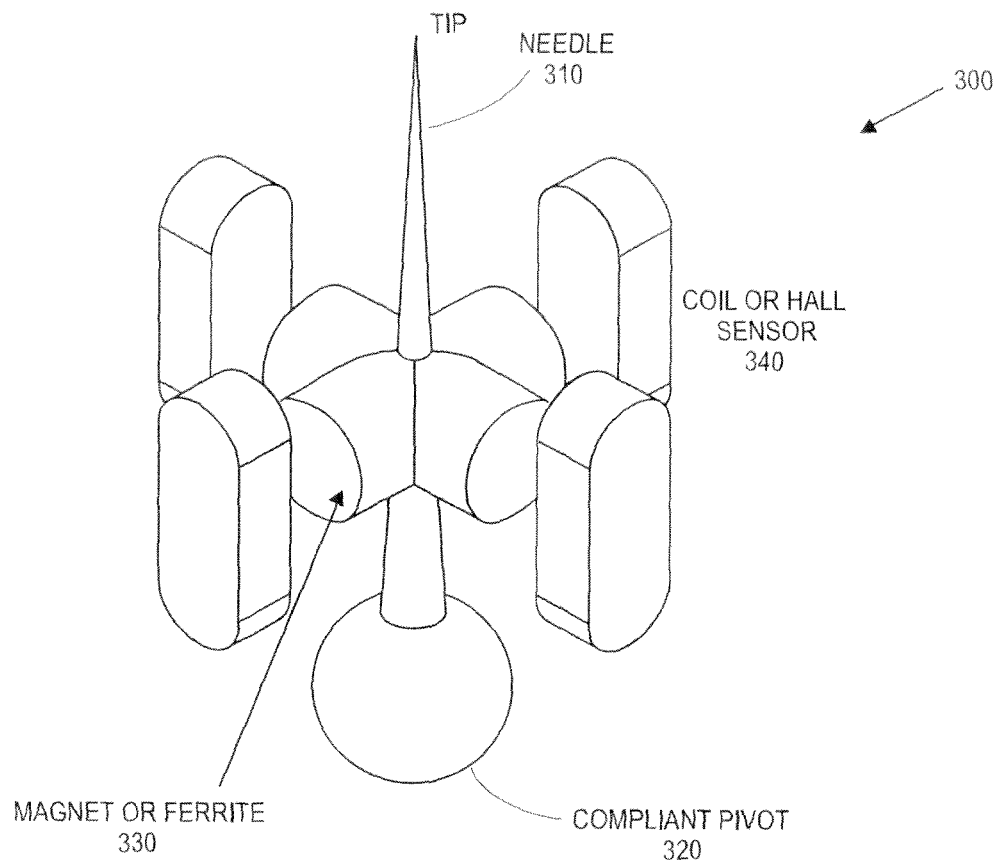
FIG. 3 shows an electromagnetic cartridge structure for indicating deflection, according to an embodiment of the invention.

FIG. 3 shows a electromagnetic cartridge structure for indicating deflection, according to an embodiment of the invention. The illustrated embodiment 300 shows a shaft 310 that may pivot around a compliant spherical pivot 320 at the proximal end of the shaft 310. The illustrated shaft might be described as a 'needle' because of its shape, but the distal end of the shaft does not have to be pointed, and the shaft structure 310 may also be referred to as a 'shaft', a 'body', or any other convenient term. Although this particular device may rotate the shaft in an angular manner around the pivot 320, other embodiments may hold the proximal end of the shaft rigidly and allow the shaft to bend. In either case, the term 'deflection', and its derivatives, will continue to be used in this document to describe this and other sensors, regardless of whether they pivot or bend. In this particular embodiment, the tip of shaft 310 may protrude vertically up through a touch surface in a direction approximately perpendicular to the touch surface, while the remainder of the parts shown in FIG. 3 would typically be below the touch surface, but other embodiments may differ. In a typical embodiment, moving a fingertip across the touch surface would cause the tip to move substantially horizontally, thus deflecting the shaft.

The shaft 310 may have magnetic or ferrite extensions 330 which can each be sensed by a coil, Hall sensor, or other type of magnetic sensing device. As the needle deflects, moving the extension closer to, or farther from, the associated coil or Hall sensor, the change in electromagnetic effect may be sensed, measured, and reported as a deflection. In some embodiments, the base of the needle may be supported in such a manner that the needle will be vertical, with equal readings on all coils, when there is no pressure on the needle to deflect it. Although four extensions/coils are shown, any feasible number may be used.

Tilting Structure

FIGS. 4A, 4B show a tilting structure for indicating deflection, according to an embodiment of the invention. In the illustrated embodiment of FIG. 4A, body 410 may be anchored to base 440 by flexible stalk 430, and may protrude slightly above touch surface 420. By dragging a fingertip across the top of the touch surface, thus pulling the top of body 410 to the side, body 410 may tilted about the stalk, thus raising or lowering the bottom surface of body 410 to be farther from or closer to the base 440. As the bottom of body 410 near the edge tries to move up or down in response to this tilting, a detector 450 make detect the amount of tilting. FIG. 4B shows three detectors located on the bottom of body 410, but any feasible number may be used. It is expected that four detectors might be a preferred embodiment in some applications, as those readings can be converted directly into X-Y coordinates for the direction of motion on the touch surface.

Figure 5B:
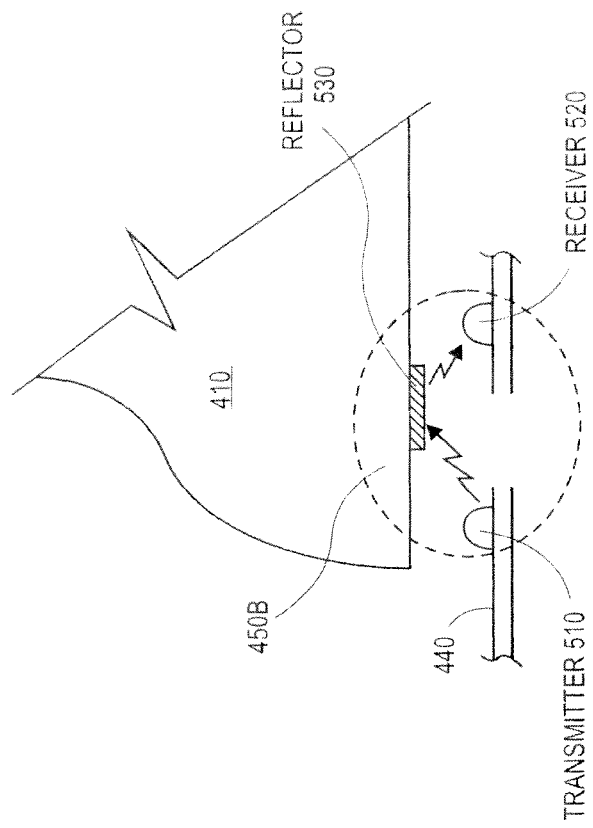
FIGS. 5A, 5B show various types of technology that can be used in the detectors 450 in FIGS. 4A, 4B, according to an embodiment of the invention
Figure 5A:
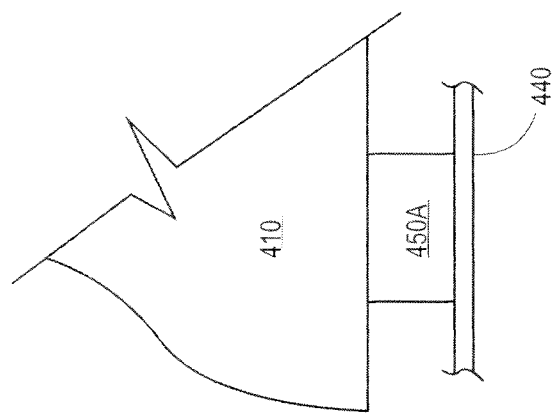

FIGS. 5A, 5B show various types of technology that can be used in the detectors 450 in FIGS. 4A, 4B, according to an embodiment of the invention. FIG. 5A shows a compression detector 450A that may respond to external compression and/or expansion caused by body 410. In one embodiment, a piezoelectric crystal may be used. Although a piezoelectric crystal may not deform by any appreciable amount, its electrical characteristics change as more pressure is applied to it. In such an embodiment, body 410 may be somewhat deformable, so that as it tilts downward against the piezoelectric crystal, the piezoelectric crystal pushes up into body 410, and the increased compression in body 410 increases the pressure on the piezoelectric crystal.

In a similar embodiment, detector 450A may be a capacitive sensor. As body 410 tilts closer to base 440, the capacitance between body 410 and base 440 may change, and this change in capacitance may be used to indicate the tilting of body 410. In such an embodiment, it may be preferable to construct body 410 with a relatively rigid material, so that the distance across detector 450A will accurately reflect the amount of tilting.

FIG. 5B shows an optical-based sensor. In the illustrated embodiment, an optical transmitter 510 may emit light which reflects off a reflective surface 530 onto an optical receiver 520. When body 410 tilts, the angle of reflection changes, which changes the amount of light that will be reflected onto receiver 520. With properly controlled dimensions, the amount of light reaching receiver 520 may have a defined relationship to the amount of tilt. Even with relatively uncontrolled dimensions, post-fabrication calibration may provide a good conversion between the amount of light sensed and the amount of tilt.

Optical Deflector

FIGS. 6A, 6B show an optical implementation for a micro-deflector, according to an embodiment of the invention. In the illustrated embodiment as shown in FIG. 6A, a small portion of body 610 extends above the touch surface 620 where it may be deflected to the side by dragging the user's fingertip across it. Most of deformable body 610 may be below the touch surface, and may be anchored to base 640. Some or all of body 610 (e.g., the top and sides) may have an optically reflective inner surface 630. The term 'reflective inner surface', as used herein, implies that light traveling within the body 610 will be reflected back within the body. The term places no restrictions on how reflection is achieved or on where a reflective material might be placed.

Within the body, an optical transmitter 660 may emit light which reflects off the reflective inner surface 630 and is detected by optical receiver 650. Two potential optical paths between the transmitter and receiver are shown, one reflecting a single time off the top center and another reflecting twice, but many optical paths may exist.

As movement by the user's finger causes body 610 to deform, the shape of the inner surface may deform, causing the reflective paths to change and the amount of light detected by the receivers to change. FIG. 5B shows three optical transmitters and three optical receivers, but any feasible number of either may be used. In various embodiments, the number of receivers may not be equal to the number of transmitters. In one particular embodiment, a transmitter may be located at the center of the base shown in FIG. 6B.

Although specific shapes, relative positions, and configurations have been shown, these are for example only. The foregoing description is intended to be illustrative and not limiting. Variations will occur to those of skill in the art. Those variations are intended to be included in the various embodiments of the invention, which are limited only by the scope of the following claims.

What is claimed is:

1. An apparatus, comprising:
   a touch surface including multiple mechanical sensors, each mechanical sensor including a micro-deflector, a first portion of the micro-deflector extending outward from a surface of the touch surface and a second portion of the micro-deflector extending below the surface of the touch surface, the micro-deflector of each mechanical sensor capable of mechanical deflection in response to force parallel to the surface of the touch surface, each mechanical sensor to generate a signal to indicate a direction of the deflection of the respective micro-deflector;
   wherein the micro-defector of each mechanical sensor is to mechanically deflect in response to an object touching the touch surface and the object contacting the first portion of the micro-defector in moving across the touch surface.

2. The apparatus of claim 1, wherein:
   the touch surface is a component in a larger device; and
   the larger device is capable of detecting a direction of a dragging movement of the object across the touch surface by processing signals from the multiple mechanical sensors.

3. The apparatus of claim 2, wherein the larger device is capable of determining which micro-deflectors are deflecting and the direction of deflection for each of the deflecting micro-deflectors.

4. The apparatus of claim 2, wherein each mechanical sensor is capable of indicating an amount of deflection of the respective micro-deflector.

5. The apparatus of claim 2, wherein each mechanical sensor is capable of indicating a speed of deflection of the respective micro-deflector.

6. The apparatus of claim 1, wherein the touch surface includes an array of additional sensors, the additional sensors to be used to in combination with the multiple mechanical sensors to determine an input motion from a user's thumb.

7. The apparatus of claim 1, wherein said each mechanical sensor uses a magnetic sensing to detect deflection of the respective micro-deflector.

8. The apparatus of claim 1, wherein said each mechanical sensor uses a piezoelectric crystal to detect deflection of the respective micro-deflector.

9. The apparatus of claim 1, wherein each said mechanical sensor uses an optical receiver to detect deflection of the respective micro-deflector.

10. A method, comprising:
    receiving a signal from each of multiple mechanical sensors of a touch surface indicating movement of an object across the touch surface, each mechanical sensor including a micro-deflector, a first portion of the micro-deflector extending outward from a surface of the touch surface and a second portion of the micro-deflector extending below the surface of the touch surface, the micro-deflector of each mechanical sensor capable of mechanical deflection in response to force parallel to the surface of the touch surface, wherein each micro-deflector is to mechanically deflect in response to an object touching the touch surface and the object contacting the first portion of the micro-deflector in moving across the touch surface, each mechanical sensor to generate a signal to indicate a direction of deflection of the respective micro-defector;
    determining a direction of the movement from the signals received from the multiple mechanical sensors; and
    interpreting the movement as a command to a device.

11. The method of claim 10, wherein the signal from each mechanical sensor includes an indication of an amount of deflection of the respective micro-deflector.

12. The method of claim 10, further comprising using the indication of movement in combination with signals from other sensors to determine the command.

13. The method of claim 12, wherein the other sensors are capacitive sensors.

14. An article comprising:
    a computer-readable non-transitory storage medium that contains instructions, which when executed by one or more processors result in performing operations comprising:
    receiving a signal from each of multiple mechanical sensors of a touch surface indicating movement of an object across the touch surface, each mechanical sensor including a micro-deflector, a first portion of the micro-deflector extending outward from a surface of the touch surface and a second portion of the micro-deflector extending below the surface of the touch surface, the micro-deflector of each mechanical sensor capable of mechanical deflection in response to force parallel to the surface of the touch surface, wherein each micro-deflector is to mechanically deflect in response to an object touching the touch surface and the object contacting the first portion of the micro-deflector in moving across the touch surface, each mechanical sensor to generate a signal to indicate a direction of deflection of the respective micro-defector;
    determining a direction of the movement from the signals received from the multiple mechanical sensors; and
    interpreting the movement as a command to a device.

15. The article of claim 14, wherein the signal from each mechanical sensor includes an indication of an amount of deflection of the respective micro-deflector.

16. The article of claim 14, further comprising the operation of using the indication of movement in combination with signals from other sensors to determine the command.

17. The article of claim 16, wherein the other sensors are capacitive sensors.

18. The apparatus of claim 1, wherein the micro-deflectors of the mechanical sensors are not visible in detail by an unaided eye.

19. The apparatus of claim 1, wherein the object is a finger of a user of the apparatus.

* * * * *